UNITED STATES PATENT OFFICE.

ROBERT E. SCHMIDT AND ANDREAS JACOBI, OF ELBERFELD, GERMANY, ASSIGNORS TO THE FARBENFABRIKEN OF ELBERFELD COMPANY, OF NEW YORK, N. Y.

ANTHRAQUINONE DYE AND PROCESS OF MAKING SAME.

SPECIFICATION forming part of Letters Patent No. 666,702, dated January 29, 1901.

Application filed May 16, 1900. Serial No. 16,849. (Specimens.)

*To all whom it may concern:*

Be it known that we, ROBERT E. SCHMIDT and ANDREAS JACOBI, doctors of philosophy, chemists, (assignors to the FARBENFABRIKEN OF ELBERFELD COMPANY, of New York,) residing at Elberfeld, Germany, have invented a new and useful Improvement in New Anthraquinone Dyes; and we hereby declare the following to be a clear and exact description of our invention.

Our invention relates to the production of new dyestuffs by causing primary aromatic amins to act on the nitrooxyanthraquinonesulfonic acid having the following formula:

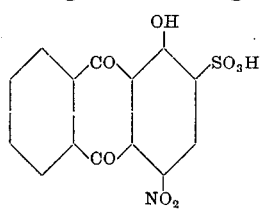

This acid can be obtained by sulfonating and then nitrating erythroxyanthraquinone. The dyestuffs thus obtained are acids having in a free state the following general formula:

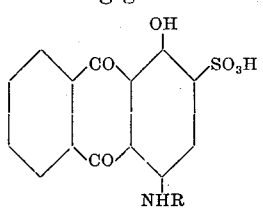

(in which formula R means an alphyl radical, such as phenyl, tolyl, xylyl, or the like.)

The new coloring-matters represent darkblue powders more or less easily soluble in water with a blue color. They yield on unmordanted wool blue shades and on chromemordanted wool greenish-blue shades.

In carrying out our new process practically we can proceed as follows, the parts being by weight: A mixture prepared from ten parts of the potassium salt of nitrooxyanthraquinone-sulfonic acid having the above-given formula, two hundred parts of a fifty-per-cent. acetic acid and one hundred parts of paratoluidin, is heated in a water-bath for about from two to three days until the melt has assumed a dark greenish-blue color. Subsequently the reaction mixture is poured into dilute hydrochloric acid. The coloring-matter which is separated by means of this operation is filtered off and further purified in the usual way. It has in a free state the following formula:

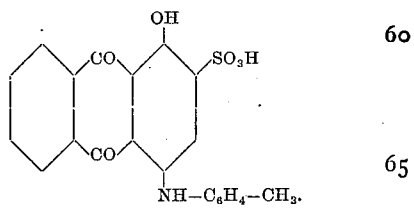

When dry and pulverized, the new coloring-matter represents a dark-blue powder difficultly soluble in water with a blue color, also soluble with difficulty in a dilute caustic alkaline solution with a bluish-green color. By concentrated sulfuric acid (of 66° Baumé) it is dissolved, yielding a green solution, the color of which changes into blue on the addition of boric acid.

The new dyestuff dyes unmordanted wool reddish-blue shades and chrome-mordanted wool greenish-blue shades.

The process proceeds in an analogous manner if instead of paratoluidin other aromatic amins are employed in the above example.

Having now described our invention and in what manner the same is to be performed, what we claim as new, and desire to secure by Letters Patent, is—

1. The process for producing new anthraquinone dyestuffs which process consists in first heating the nitrooxyanthraquinone-sulfonic acid having the formula

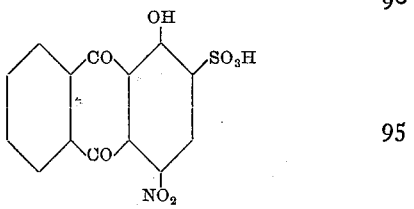

with primary aromatic amins, secondly separating the new dyestuffs thus produced from the reaction mixture and finally isolating the same, substantially as hereinbefore described.

2. The process for producing a new anthraquinone dyestuff which process consists in first heating the nitrooxyanthraquinone-sulfonic acid having the following formula:

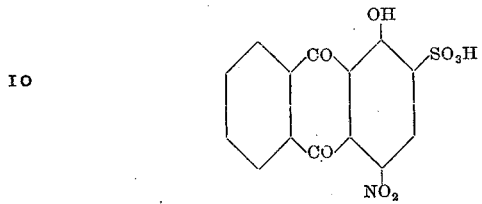

with paratoluidin, secondly separating the new dyestuff thus produced from the reaction mixture and finally isolating the same, substantially as hereinbefore described.

3. The herein-described new anthraquinone dyestuffs obtainable from nitrooxyanthraquinone-sulfonic acid and primary aromatic amins, which dyestuffs, when dry and pulverized, are dark-blue powders dissolving more or less easily in water with a blue color, dyeing unmordanted wool blue shades and chrome-mordanted wool greenish-blue shades, substantially as hereinbefore described.

4. The herein-described new specific anthraquinone dyestuff having in a free state the following formula:

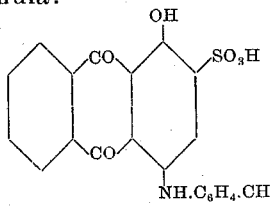

which is, when dry and pulverized, a dark-blue powder difficultly soluble in water with a blue color, being also soluble with difficulty in dilute caustic soda-lye with a bluish-green color, being dissolved by concentrated sulfuric acid of 66° Baumé yielding a green solution the color of which turns into blue on the addition of boric acid, dyeing unmordanted wool reddish-blue shades and chrome-mordanted wool greenish-blue shades, substantially as hereinbefore described.

In testimony whereof we have signed our names in the presence of two subscribing witnesses.

ROBERT E. SCHMIDT.
ANDREAS JACOBI.

Witnesses:
OTTO KÖNIG,
F. A. RITTERHAUS.